June 14, 1960  R. W. HUNTER  2,940,481
METHOD AND APPARATUS FOR INSTALLING RADIANT HEATING CABLES
Filed Nov. 4, 1955  3 Sheets-Sheet 1
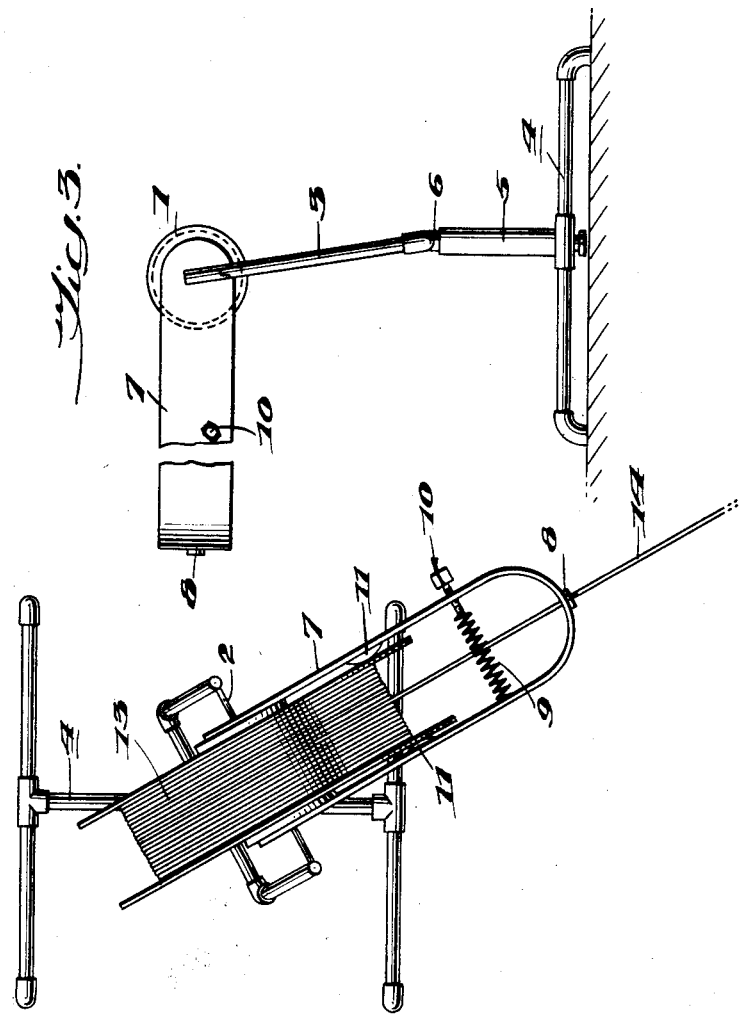
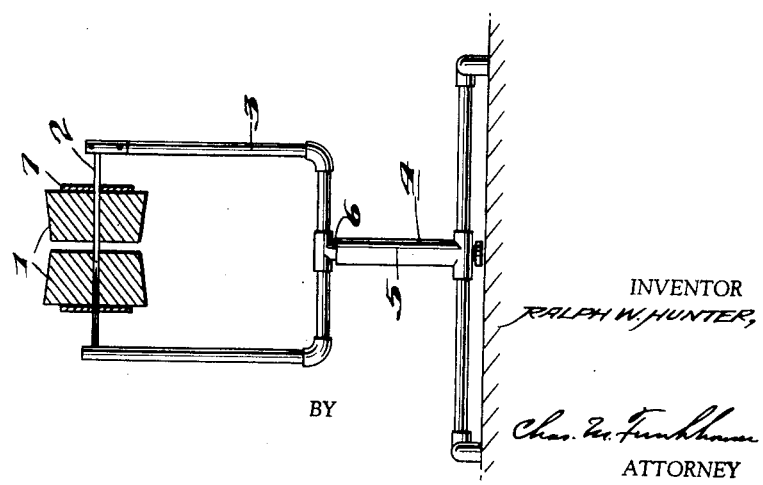
INVENTOR
RALPH W. HUNTER,
BY
Chas. M. Funkhouser
ATTORNEY June 14, 1960  R. W. HUNTER  2,940,481
METHOD AND APPARATUS FOR INSTALLING RADIANT HEATING CABLES
Filed Nov. 4, 1955  3 Sheets-Sheet 2
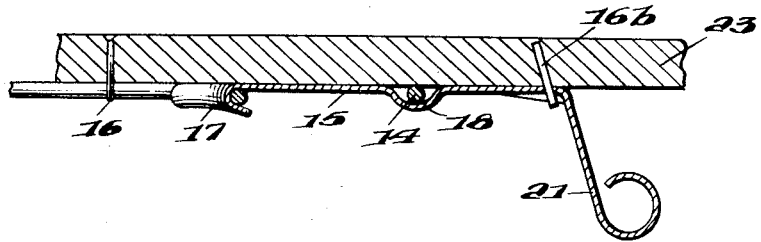
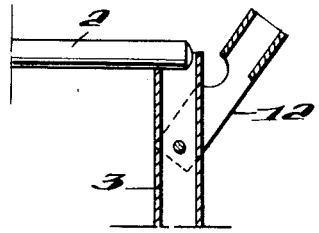
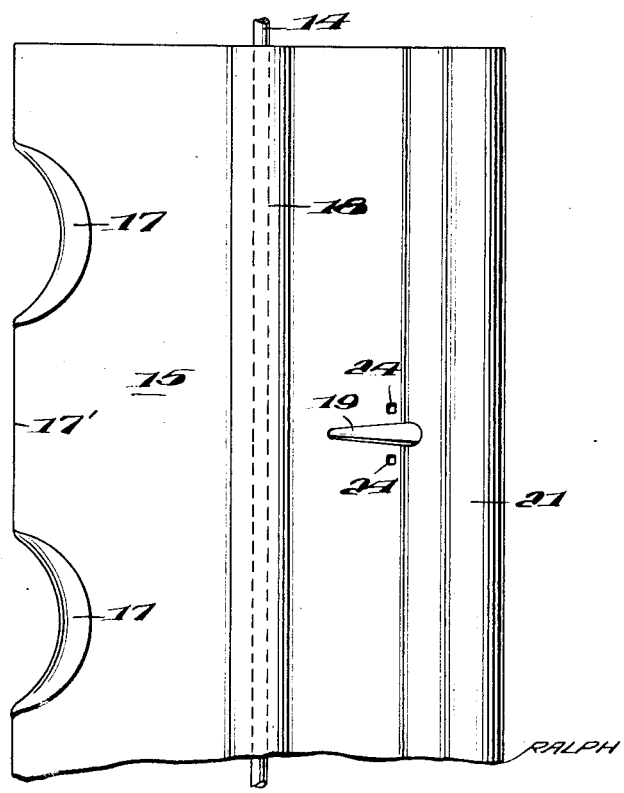
INVENTOR
RALPH W. HUNTER,
BY
ATTORNEY

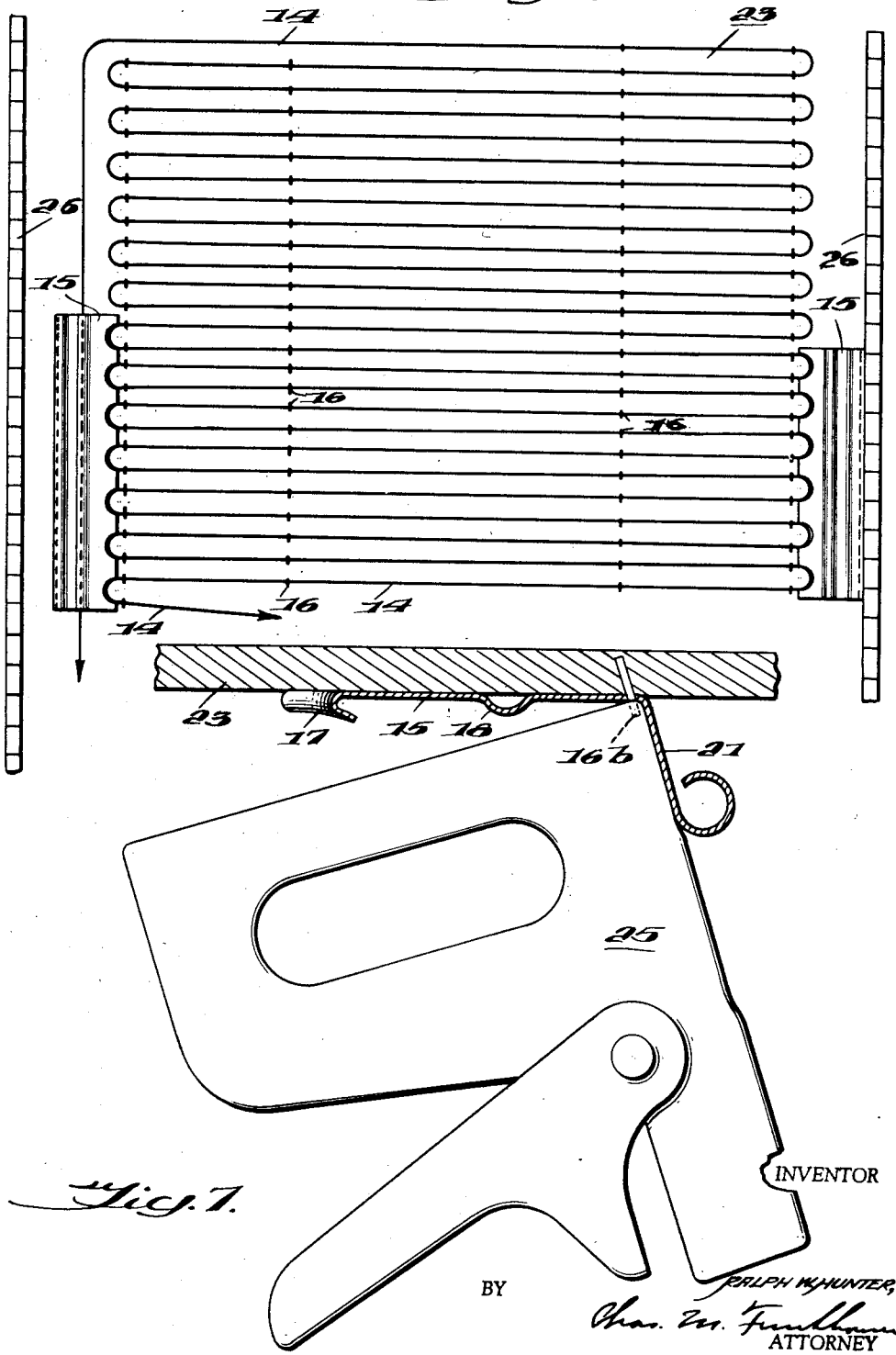

United States Patent Office 2,940,481
Patented June 14, 1960

2,940,481

METHOD AND APPARATUS FOR INSTALLING RADIANT HEATING CABLES

Ralph W. Hunter, P.O. Box 4194, Jacksonville, Fla.

Filed Nov. 4, 1955, Ser. No. 544,903

1 Claim. (Cl. 140—93)

This invention relates to radiant electric heating and more particularly to a novel method of installing the electric cables or wires and novel apparatus for accomplishing the work in a more efficient and economical manner.

The employment of radiant heat in building structures such as dwellings, for example, is well known in the radiant heating art and that the electric heating wires are usually laid in the floor or ceiling to accomplish the desired result. The resistance wires usually employed in making up the heating cables include alloys of copper which are much more fragile than ordinary wires and for this reason greater care must be exercised in the installing of such heating cables. The insulated electric cables are usually laid back and forth and embedded in the concrete or plaster material monolithic floor or ceiling structure. It is highly desirable and necessary that the wires shall be accurately spaced apart and embedded in concrete or plaster to produce the desired uniform and efficient heating results. Considerable difficulty has heretofore been experienced in stringing or placing the cable back and forth over the support surface without injury from sharp bends or kinking. It is contemplated that the use of the term radiant heating element support shall include any fabricated monolithic floor or ceiling structure.

One important object of the present invention is to provide a novel method of and apparatus for installing electric heating wires or cables in a monolithic support for radiant heating purposes.

Another object of the invention is to provide a novel method of installing radiant heating cables in a reliable and efficient manner to meet the many rigid safety requirements of such installation's specifications.

Another object of the invention is to provide a novel wire holding tool which shall uniformly hold and space the wires while being applied to a floor or ceiling support in an efficient and expeditious manner.

A further object of the invention is to provide a novel form of wire holding and applying apparatus for dispensing the wire from a coil to the point of application in an efficient and expeditious manner.

A further object of the invention is to provide apparatus of the character designated which shall enable the method to be carried out at a minimum cost of material and labor for such installations.

These and other objects of the invention will be more manifest from the following specification and particularly set forth in the claim.

In the drawings:

Fig. 1 is a top view of the wire coil dispensing apparatus;

Fig. 2 is a front view of the wire coil holder shown in Fig. 1;

Fig. 2a is a detailed view of the axle latch member shown in Fig. 2, in open position;

Fig. 3 is a side view in elevation of the coil holder shown in Fig. 2;

Fig. 4 is a plan view of a wire placing and spacing tool;

Fig. 5 is a sectional end view of the tool shown in Fig. 4 applied to a support for positioning an electric wire;

Fig. 6 is a plan view of an electric heating wire layout embodying the method of applying the wire to a support; and Fig. 7 is a view in elevation partially in section of a staple applying tool in conjunction with the wire placing and spacing tool shown in Fig. 4.

Referring to Figs. 1, 2, 2a and Fig. 3 of the drawings, there is shown a novel form of portable electric wire coil holding stand 4 for dispensing a strand of heating wire to the surface of a designated base support heating structure as indicated by the numeral 23 in Figs. 5 and 7. This support structure forming a radiant heating unit may be a floor or ceiling of radiant heating system frequently employed for household heating purposes.

The stand 4 is made portable so as to facilitate the dispensing of heating wire to a ceiling or floor and includes a rearwardly sloping fork shaped member 3 having an axle 2 releasably mounted in the free ends of the fork legs so as to facilitate the placing thereon and removal therefrom of a reel of wire indicated by the numeral 13. The axle parts for mounting and supporting the reel 13 includes two cooperating spool members 1—1 having oppositely disposed bevel surfaces to hold the reel 13 in a clamped position as effected by the side members of a guide frame 7—7 located on opposite sides of the spools 1—1 on the axle 2. The fork 3 is carried by a stem 6 which is swivelly mounted in a sleeve 5 to permit a free lateral movement of the reel when applying heating wire to a surface such as a ceiling. It will be noted that this novel mounting of the reel 13 permits the reel to rotate in a vertical plane while the supporting fork 3 rotates in a horizontal plane. One arm of the fork 3 is provided with a latch member 12 to release the axle 2 to permit replacement of reels 13 on the axle as shown in Fig. 2a.

The stand 4 also includes a substantially U-shaped sheet metal pilot guide frame member 7 having its side leg end portions straddling the reel 13 and pivotally connected to the axle 2. The curved front end of the guide 7 is provided with an opening 8 to receive and direct a strand of wire 14 from the reel to the point of application or use without danger of damage to the fragile conductor wire by kinking or tangling. The sides of the frame 7 are provided with inwardly struck depressed portions 11—11 to provide a contact braking effect on the outside surface of reel 13 at the periphery thereof when under rotative tension and while dispensing wire. The braking tension action on the periphery of the cable reel is regulated by an adjustable cross connection spring member indicated by the numeral 9 and threaded adjustment portion 10. The dispensing reel is self-operating. No handle is used. The latch shown in Fig. 2a simply provides a quick way of removing an empty spool and putting in a full one. The important feature of the reel carrying frame is to maintain the wire under tension at all times to prevent tangling or kinking of the wire all of which impairs the installation workman's efficiency with resulting labor costs. Another important feature of the guide frame 7 is that it keeps the plane of rotation of the reel-spool always aligned with the direction of pull of the cable being unwound from the spool regardless of the direction of pull by the workman.

The particular manner of applying the heating wire or cable is illustrated in Figs. 4, 5, 6 and 7 wherein the novel form of wire lacing or spacing tool 15 is employed.

The tool for spacing and temporarily securing the ends of the heating wires while they are being placed or applied to an appropriate support includes a substantially flat rectangular sheet metal guide plate member or template constructed and arranged to accommodate a plurality of arcuate shaped guide members indicated by the numeral 17. It has been found by experience and to meet certain Underwriters' specifications that the guide members shall be spaced about an inch and a half apart. This spacing will insure against any irregular spacing of the cables so that the installation will readily meet the rigid inspection requirements for such installations.

The guides 17 are arcuate shaped and struck upwardly from the plate edge portion to provide rearwardly extending hook-like portions 17 to receive and hold a strand of wire while being strung or run back and forth over the receiving surface with which the wire 14 is to form the desired heating unit. It will be noted that the arcuate space 17 formed by a hook is substantially the same width or distance as the space 17' between the hooks 17. This construction eliminates sharp bends in the heating cable ends and reduces to a minimum any danger of the cable insulation covering becoming broken or ruptured and the delicate wires being damaged during the handling thereof. To further facilitate the operation of the plate 15, the central longitudinal portion is provided with a surface channel 18 to receive an end lead of the wire 14 located at the edge of the heating wire array so that the plate 15 may lie flat on the surface of the support 23 when the heating cable is being strung as hereinafter more specifically set forth in carrying out the novel method of forming such radiant heating systems.

The rear edge of the sheet metal plate 15 is provided with an inclined roll portion 21 which serves as a hand member to manipulate the plate during placing, shifting, and removal from position to position along the support surface 23 as illustrated in Fig. 6. The plate 15 is temporarily secured in place by an inclined staple 16b guided by a depression 19 and guide holes 24—24. The staples are driven in place by a conventional stapler indicated by the numeral 25. The staple 16b is inclined to give the maximum holding strength and to insure such holding effect, and the inclination is indicated by the guide roll portion 21 when the end of the tool 25 is placed against it as shown in Fig. 7.

While I have specifically described one cable holder and spacer 15, it will be obvious that two such holders are employed, one on each side of the support surface 23 as illustrated in Fig. 6 to effect the desired stringing back and forth of the heating cable in an expeditious manner.

Having thus described novel apparatus for laying electric heating cables, the method of operation is carried out in the following manner. A monolithic support member 23, such as a dwelling room floor or ceiling, to be radiantly heated is measured and the heating cables laid or strung back and forth over the surface in parallel relation spaced by the pair of templates 15—15 and secured in the most efficient manner by appropriately spaced wire staples 16. A pair of plates 15 are employed, each temporarily fastened on opposite sides of the flat surface supported by a staple 19 advantageously placed to hold the plate in position. The heating cable is then strung back and forth between the arcuate holders 17—17 on the respective plates. After each run of cable, the wire is securely stapled to the support 23 between the plates 15. The number of individual arcuate holders 17 for each plate tool may be varied to suit the convenience of the workman. It has been found that six such holders spaced about an inch and a half apart provide a very convenient tool and may be used to advantage by the workman on large area ceiling or floor surfaces. It will be understood that the novel method of laying the cables may be employed for specific areas on the surface to be heated. After the area for each corresponding pair of templates is completed and the wires stapled in place, the templates are loosened and moved forward or displaced a sufficient distance to free the arcuate ends from the cable loops and thus permit removal of the plate by sliding it in a rearward direction without any further disturbance of the end loops of wire. After removal of the guide template 15, each loop end of the several individual runs may be secured by a single staple. The templates 15 are then moved to an adjacent position along the support surface to commence a new area of wire placing until the desired area is covered.

From the foregoing it will be apparent that my novel method and apparatus may be employed for expeditiously placing heating wires on any particular area of a surface to be heated. For example, when placing heating wires on a floor, it is desirable to place the wires so as to obtain maximum heating effect near openings such as doors or windows. The particular area to be heated is measured by a suitable gauge indicated by the numeral 26 and the template guides are positioned so that the heating wires may be placed in the most efficient manner at a minimum labor cost and at the same time meet the rigid inspection requirements of the Underwriters'. Furthermore, the practical use of my improved method of laying heating wires over a designated area has reduced labor costs to a minimum as well as increase the efficiency of the heating installation to a maximum.

While I have shown a preferred embodiment of my invention, changes may be made without departing from the scope of the invention as defined in the claim.

What I claim is:

The method of installing electric heating wires within the monolithic structure of room ceilings, walls, floors or the like during the construction thereof which comprises the following steps, one, constructing a planar subsurface element as a permanent part of said monolithic structure, two, attaching spaced apart temporary wire holding guide plate members at the edge of said element, each guide plate having a plurality of arcuate shaped wire retaining elements spaced apart thereon by the width of the arcuate element, three, stringing a strand of wire in a predetermined sinuous path over the surface and around the respective arcuate retaining elements at uniform tension between each arcuate guide, four, securing the wire to said subsurface element at spaced intervals intermediate the guide plates to maintain the tension of each individual strand, five, removing the guide plates to free the arcuate looped portions of wire, six, securing the thus freed loop wire ends to the planar structural surface and finally covering the assembled wires, whereby the heating wires are embedded in and become a part of said monolithic structure.

References Cited in the file of this patent

UNITED STATES PATENTS

| | | |
|---|---|---|
| 1,993,348 | Musgrave et al. | Mar. 5, 1935 |
| 2,086,086 | Newton | July 6, 1937 |
| 2,380,117 | Maldanado | July 10, 1945 |
| 2,385,796 | Crom | Oct. 2, 1945 |
| 2,385,973 | Eitel | Oct. 2, 1945 |
| 2,402,696 | Track | June 25, 1946 |
| 2,685,128 | Tournon | Aug. 3, 1954 |

FOREIGN PATENTS

| | | |
|---|---|---|
| 661,155 | Great Britain | Mar. 14, 1951 |